United States Patent [19]

Oda

[11] Patent Number: 4,823,293

[45] Date of Patent: Apr. 18, 1989

[54] CORRELATION TIME-DIFFERENCE DETECTOR

[75] Inventor: Minoru Oda, Hyogo, Japan

[73] Assignee: Mitsubishi Denki Kabushiki Kaisha, Tokyo, Japan

[21] Appl. No.: 838,719

[22] Filed: Mar. 12, 1986

[30] Foreign Application Priority Data

Mar. 13, 1985 [JP] Japan .................................. 60-48398

[51] Int. Cl.$^4$ ...................... G06J 1/00; G06F 15/336; G04F 10/04
[52] U.S. Cl. .................................... 364/604; 364/602; 364/569
[58] Field of Search ............... 364/602, 819, 820, 604, 364/605, 569, 724, 728.03; 370/18; 328/86, 83 R, 83 D, 133; 375/1, 115

[56] References Cited

U.S. PATENT DOCUMENTS

| | | | |
|---|---|---|---|
| 3,818,231 | 6/1974 | Gopal et al. | 250/356 |
| 3,912,915 | 10/1975 | Kalb et al. | 364/724 |
| 4,270,180 | 5/1981 | Charlton | 364/604 X |
| 4,644,523 | 2/1987 | Horwitz | 370/18 |
| 4,779,215 | 10/1988 | Moisan et al. | 364/569 |

*Primary Examiner*—Jerry Smith
*Assistant Examiner*—Charles B. Meyer
*Attorney, Agent, or Firm*—Bernard, Rothwell & Brown

[57] ABSTRACT

A detecting instrument for detecting time difference between input times of two signals through the use of correlation function is disclosed. The instrument includes a digital circuit for repetitive computing of the correlation function between the two input signals and an analog circuit for detecting the phase of the fundamental frequency component of the repeated correlation function provided by the digital circuit.

6 Claims, 2 Drawing Sheets

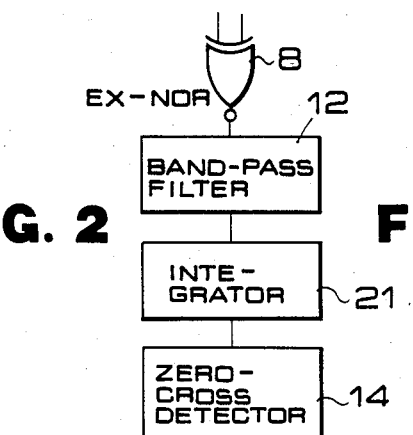
FIG. 2
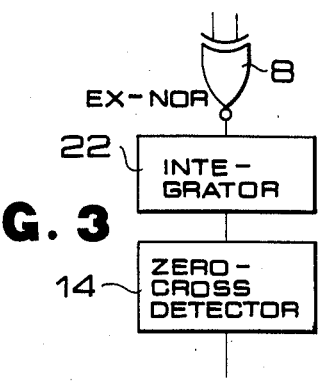
FIG. 3
FIG. 4
(PRIOR ART)
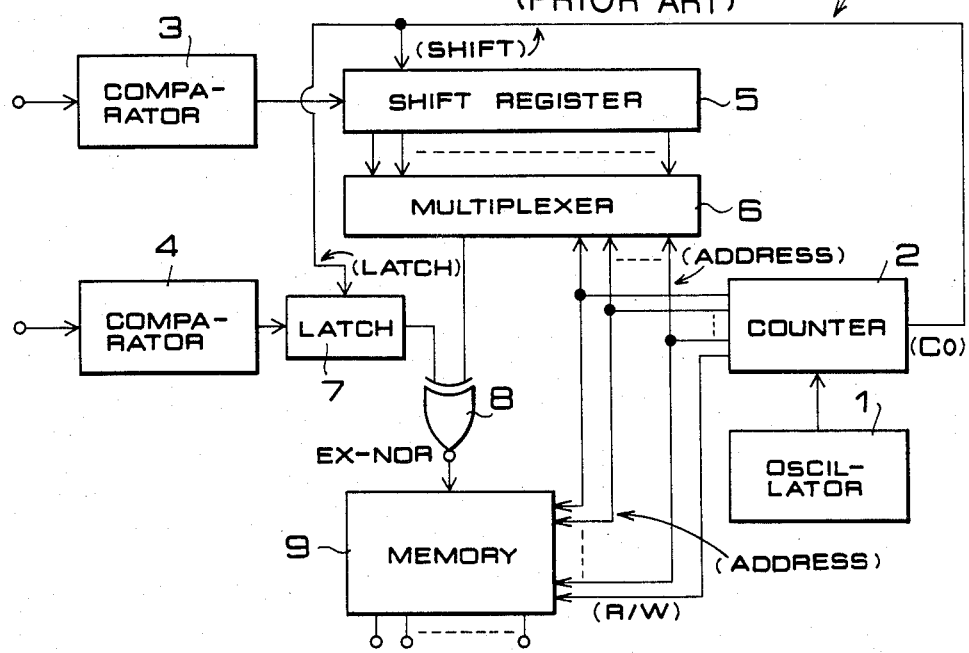
FIG. 5
(PRIOR ART)
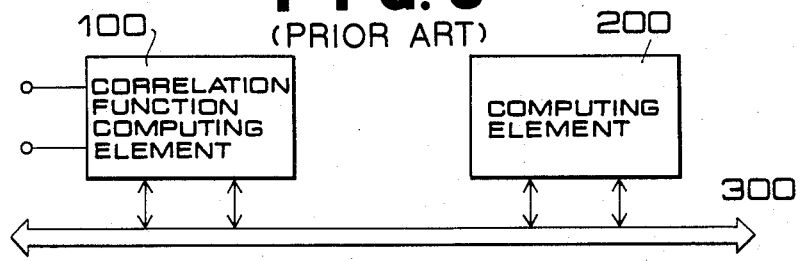

CORRELATION TIME-DIFFERENCE DETECTOR

BACKGROUND OF THE INVENTION

1. Field of the Invention

The present invention relates to a correlation time-difference detector and more particularly to a correlation time-difference detector for measuring a relative time difference between two analog input signals having correlation with each other.

2. Description of the Prior Art

FIGS. 4 and 5 exemplify structure of a prior art correlation time-difference detector of the mentioned type. The prior art exemplified there is of the type in which the input analog signals are converted into binary signals and an exclusive NOR (EX-NOR) circuit is used for multiplication and summation thereof. Referring now to FIG. 4, there is exemplified structure of a correlation function computing element 100 being used in the correlation time-interval detector. In FIG. 4, 1 denotes a clock oscillator, 2 denotes a counter, 3 and 4 denote comparators, 5 denotes a shift register, 6 denotes a multiplexer, 7 denotes a latch, 8 denotes an exclusive NOR gate, and 9 denotes a memory.

Operation of the same will be described in the following. The counter 2, in response to the output signal from the clock oscillator 1, outputs address signals for the multiplexer 6 and memory 9, a shift signal for the shift register 5, a latch signal for the latch 7, and read/write signals (R/W) for the memory 9. The counter 2 is a preset counter in which the number of bits of the shift register 5, corresponding to its number of stages, is established as its preset number, and a carry signal (Co) to be generated thereby each time the full count is reached therein is used as the above mentioned shift signal and latch signal. The two analog signals as the objects of the measurement are input to comparators 3 and 4, respectively, and, depending on their being positive or negative, signals converted into a binary form, namely, such as to take the value "1" when positive, and the value "0" when negative, are output therefrom. The aforesaid binary output signals from the comparators 3 and 4 are sent to the shift register 5 and latch 7 in response to the carry signal (Co) to be generated by the counter 2 each time the full count is reached. In the shift register 5 is stored the data in the past indicating the period of time corresponding to the product of its number of bits and the period of the shift signal equivalent to the carry signal. Meanwhile, during one period of the carry signal, the counter 2 increases the address signal for the multiplexer 6 corresponding to the bits of the shift register 5 successively from its front to rear, whereby the data in the shift register 5 are read out in succession and supplied to the exclusive NOR 8 by way of the multiplexer 6. The exclusive NOR 8 also receives an output signal from the latch 7 and compares the same with the output signal from the multiplexer 6 and outputs "1" if these agree with each other and outputs "0" otherwise. Supposing now, out of the two analog signals, the one for the comparator 3 having a time difference preceding the other, probability for two input signals to agree with each other will be higher when the multiplexer 6 is reading the data in the shift register 5 in the vicinity of the address corresponding to the preceded time interval, hence the probability of the output of the exclusive NOR 8 to become "1" will then be higher. On the other hand, the correlation between the signals corresponding to other time intervals than that will be lower, and so the probability for the output to become "1" will be lower. That is, average value of the output of the exclusive NOR 8 becomes high when the read out data correspond to the time difference between the two signals. The variations of this output approximately represent the cross-correlation function between the two analog signals. Therefore, by knowing the time interval, namely, the corresponding address in the shift register, which makes the correlation function maximum, the time interval between the inputs of the two analog signals can be determined. But, only one time of scanning by the multiplexer 6 does not provide an accurate correlation function. Therefore, in order to improve the accuracy, it is the practice to repeat the scanning and accumulate the computed results in the memory 9 and to take an average therefrom.

Then, referring to FIG. 5, there is schematically indicated the structure of a correlation time-difference detector including the correlation function computing element as shown in FIG. 4. In FIG. 5, 100 denotes the correlation function computing element, 200 denotes a specific computing element such as a microprocessor, and 300 denotes a data bus. In this arrangement, the chief function of the computing element 200 is to determine the position of the peak of the correlation function obtained by the correlation function computing element 100. The computing element 200 cyclically drives the correlation function computing element 100 to cause the computed results of the correlation function to be further accumulated in the memory 9 (FIG. 4) for improvement of the accuracy. After sufficiently high accuracy is thus obtained, the peak position of the correlation function is computed. The peak position is computed by means of fitting by parabolic function, or normal distribution function, or center-of-gravity calculation. The product of the value of the peak position of the correlation function expressed by the address in the shift register 5 (FIG. 4) thus obtained and the period of the carry signal gives the time difference between the two analog signals under measurement.

The prior art correlation time-interval detector as described above had a problem that, in order to compute the peak position of the correlation function it, had to have a computing element such as a microprocessor provided at the succeeding stage to the correlation function computing element. It was also a problem for the prior art correlation time-difference detector that it could provide the value of measurement only intermittently.

SUMMARY OF THE INVENTION

The invention has been made to solve these problems encountered in the prior art and has a primary object to provide a correlation time-interval detector which is able to compute the peak position of the correlation function by means of a simple analog circuit thereby to eliminate the need for the computing element and provide values of measurement on the subject continuously.

The correlation time-difference detector according to the invention comprises a correlation function computing element for calculating the correlation function between two analogue input signals and a peak position computing element for computing the peak position of the correlation function, and the analog circuit constituting the peak position computing element includes means for extracting a desired frequency component having the same frequency as the frequency for driving the correlation function computing element.

According to the correlation time-difference detector of the invention, the correlation function, i.e., the computed output from the correlation function computing element, is cyclically furnished into a band-pass filter in the peak position computing element and the peak position of the correlation function from the correlation function computing element is provided thereby as phasic information corresponding to the furnished data.

BRIEF DESCRIPTION OF THE DRAWINGS

FIGS. 2 and 3 are block diagrams showing portions of different types of the correlation time-interval detectors according to the invention;

FIG. 4 is a block diagram showing a correlation function computing element used in a prior art correlation time-interval detector; and FIG. 5 is a block diagram showing a correlation time-interval detector including the correlation function computing element of FIG. 4.

DETAILED DESCRIPTION OF THE PREFERRED EMBODIMENT

Figure 1:
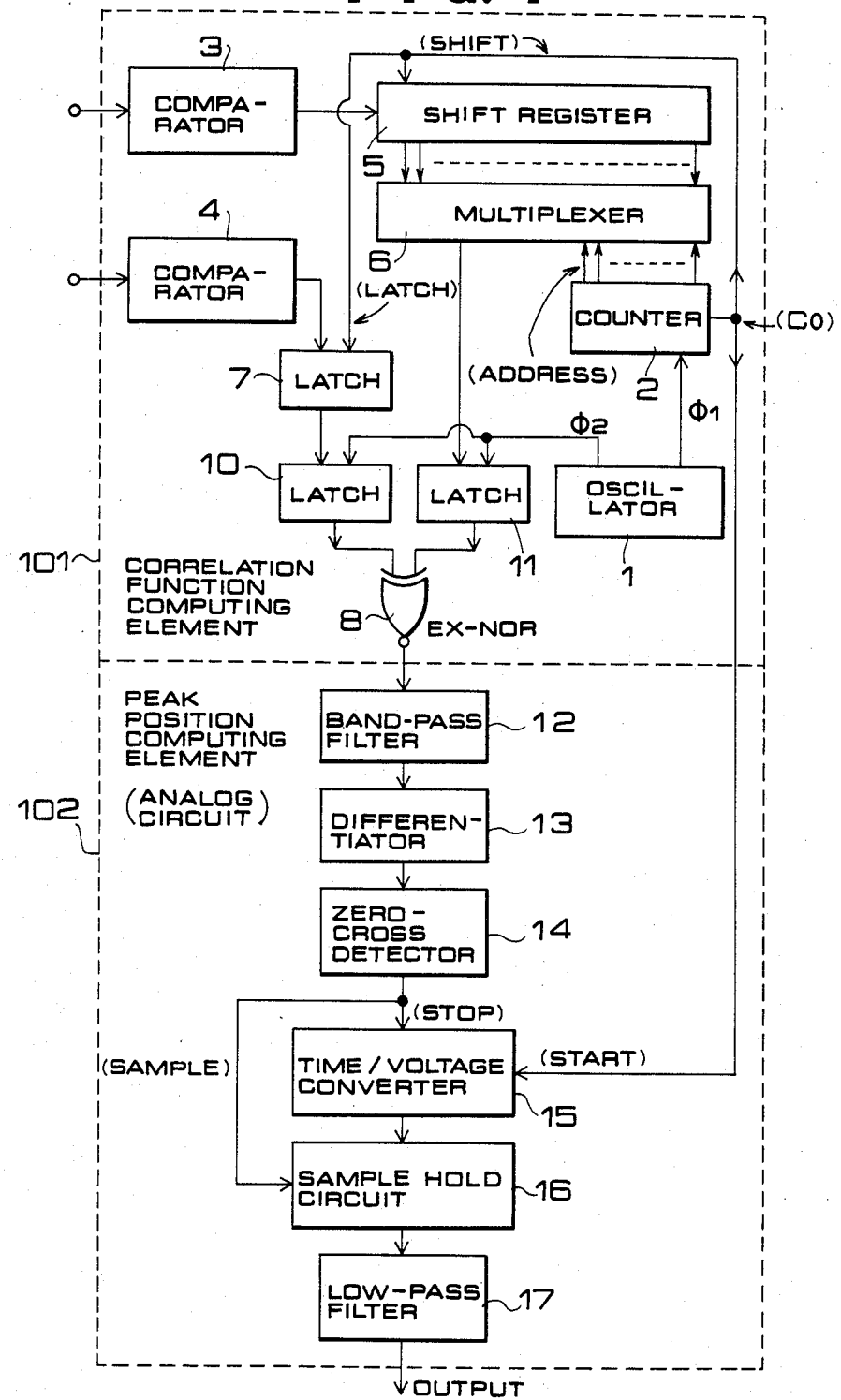
FIG. 1 is a block diagram showing a correlation time-interval detector according to the invention.

Referring to FIG. 1 schematically showing structure of one embodiment of the correlation time-interval detector of the invention, 1 denotes a clock oscillator, 2 denotes a counter, 3 and 4 denotes comparators, 5 denotes a shift register, 6 denotes a multiplexer, 7 denotes a latch, 8 denotes an exclusive NOR, and 10 and 11 denote latches, by all of which is constituted a correlation function computing element 101. And, 12 denotes a band-pass filter, 13 denotes a differentiator, 14 denotes a zero-cross detector, 15 denotes a time/voltage converter, 16 denotes a sample hold circuit, and 17 denotes a low-pass filter, by all of which is constructed a peak position computing element (analog circuit) 102.

In the embodiment of the invention constructed as described above, the manner of operation from the clock oscillator 1 to the exclusive NOR 8 are substantially the same as the case of the prior art as shown in FIG. 4, excepting for the two latches 10 and 11 provided at the preceding stage to the exclusive NOR 8, which are for adapting the output of the multiplexer 6 to be matched with the output of the latch 7, namely, the outputs of the latches 10 and 11 are renewed by a signal $\phi_2$ which is slightly delayed from the signal $\phi_1$ from the clock oscillator 1 causing the address signal for the multiplexer 6 to be produced. By the way, these latches 10 and 11 can be omitted in the case where the signal processing rate is low. In the prior art example as shown in FIG. 4, the output signals from the exclusive NOR 8 were accumulated in the memory to be summed and averaged, but in the present embodiment, the output signals from the exclusive NOR 8 are supplied to the band-pass filter 12. The output signals from the exclusive NOR 8 take a higher average value when, as described earlier, the multiplexer 6 is reading in the vicinity of the specific address in the shift register 5, namely, the address corresponding to the time difference between the two analog signals. The multiplexer 6, responding to the carry signal (Co) output from the counter 2, makes the similar read operation in a cyclic manner, and therefore, in the case where the output signal from the exclusive NOR 8 is such that it is regarded as a continuous, prolonged analog signal, the portions of high average value appear cyclically at intervals of the periods of the mentioned carry signal (Co). This means that the output signal from the exclusive NOR 8 includes a fundamental frequency component of the same frequency as that of the carry signal (Co). And, its phase corresponds to the peak position (address) of the aforementioned correlation function, namely, the time difference between the two analog signals. Therefore, if the aforesaid fundamental frequency component is extracted from the output signal of the exclusive NOR 8 with the phase kept intact, the mentioned time difference can be obtained from the phase. Since, here, the band-pass filter 12 is adapted such that its center frequency equals the frequency of the carry signal (Co), the phase is kept intact between the input and output. Thus, the peak position in the extracted fundamental frequency component coincides with the peak position of the correlation function.

The differentiator 13 differentiates the output signal of the band-pass filter 12 and outputs a signal to pass over the zero level at the peak point of the filter output signal. The zero-cross detector 14 generates a specific pulse signal when the output signal of the differentiator 13 passes over the zero level. The time/voltage converter 15 is a ramp signal generator; rise of its signal is controllably started and stopped, that is, it starts to rise when the carry signal (Co) is applied thereto and stops rising when the output signal from the zero-cross detector 14 is applied.

The sample hold circuit 16 is adapted to make a sampling operation of the output voltage of the time/voltage converter 15 at the time the rise is stopped, taking the output signal of the zero-cross detector 14 as the sampling command signal. The thus obtained sampling voltage is held by the sample hold circuit 16 until the succeeding sampling command signal is supplied from the zero-cross detector 14. This voltage is proportional to the peak position of the correlation function measured from the position where the carry signal (Co) is generated, and therefore, it is proportional to the time difference between the two analog signals. And the output voltage from the sample hold circuit 16 is smoothed by the low-pass filter 17. This smoothing has the same effect as the summing and averaging by the prior art memory 9 in FIG. 4 or that by the computing element 200 in FIG. 5.

According to the embodiment of the invention, the above-mentioned averaging operations are only required for a signal indicative of the time difference between the two analog signals as the subjects of the measurement; thus the operations can be performed simply by the low-pass filter 17. Now, the function of the band-pass filter 12 will further be described. The band-pass filter 12 is for extracting the fundamental frequency component as stated above, but it is desirable that the smoothing of the phase variation is also achieved at the same time. If one having a larger resonance characteristic (Q) is selected as the band-pass filter 12, effective smoothing of the variation of the phase of the input signal can be attained.

The differentiator 13 employed in the embodiment of FIG. 1 has the effect to shift the phase angle of the fundamental frequency component by 90°. Therefore, instead of the differentiator 13 employed in the embodiment of FIG. 1, an integrator 21 can be used as shown in FIG. 2. Or, instead of the band-pass filter 12 and differentiator 13 as shown in FIG. 1, only an integrator 22 may be used connected with the output end of the EX-NOR gate 8 at its input end and with the input end of the zero-cross detector 14 at its output end. The latter variants as shown in FIG. 3 can advantageously be used when the average frequency of the input signal is relatively low.

Furthermore, the time/voltage converter 15 and sample hold circuit 16 used in the embodiment of FIG. 1 may be substituted for by a timer formed of a combination of a suitable oscillator and counter and adapted to be started by the output of the counter 2 and stopped by the output of the zero-cross detector 14.

According to the invention as described so far, the correlation time-difference detector is structured by a correlation function computing element and a specific analog circuit, and the determination of the peak position of the correlation function between two analog input signals is performed by the extraction of the phase of the fundamental frequency component of the repeated correlation function. Thus, the need for a special computing element is eliminated and the required measurement value can be obtained continuously.

What is claimed is:

1. A correlation time-difference detector including a correlation function computing element operated periodically for obtaining the correlation function between two analog input signals and further including a peak position element for providing a peak position of the obtained correlation function by computation, wherein said peak position computing element comprises an analog circuit including means for extracting a fundamental frequency component of the same frequency as the operating frequency of said correlation function computing element from the output of said correlation function computing element and means for detecting the phase of the extracted fundamental frequency component with reference to a start signal of each operating cycle of said correlation function computing element.

2. A correlation time-difference detector according to claim 1, wherein said means for extracting the fundamental frequency component comprises an integrator for integrating the output of said correlation function computing element.

3. A correlation time-difference detector according to claim 1, wherein said means for extracting the fundamental frequency component comprises a band-pass filter connected to the output of said correlation function computing element and having the same center frequency as the fundamental frequency and a differentiator connected to the output of said band-pass filter.

4. A correlation time-difference detector according to claim 1, wherein said means for extracting the fundamental frequency component comprises a band-pass filter connected to the output of said correlation function computing element and having the same center frequency as the fundamental frequency and an integrator connected to the output of said band-pass filter.

5. A correlation time-difference detector according to claim 1, wherein said means for detecting the phase is connected to said means for extracting the fundamental frequency component and comprises a zero-cross detector for generating an output when the output of said means for extracting the fundamental frequency component passes over the zero level, a time/voltage converter for cyclically measuring the period of time from the supply of a start signal, which is at the same timing as the operating frequency of said correlation function computing element, to the generation of the output of said zero-cross detector at intervals of the supplying of the start signal, and a sample hold circuit for holding the output level of said time/voltage converter until said zero-cross detector generates next zero-cross output.

6. A correlation time-difference detector according to claim 5, wherein said means for detecting the phase further comprises a low-pass filter for averaging the output of said sample hold circuit.

* * * * *